(12) United States Patent
Meschkat (10) Patent No.: US 10,776,571 B2
(45) Date of Patent: Sep. 15, 2020

(54) DISPATCH OF USER INPUT TO MULTIPLE INPUT FIELDS IN A USER INTERFACE

(71) Applicant: GOOGLE LLC, Mountain View, CA (US)

(72) Inventor: Steffen Meschkat, Menlo Park, CA (US)

(73) Assignee: Google LLC, Mountain View, CA (US)

( * ) Notice: Subject to any disclaimer, the term of this patent is extended or adjusted under 35 U.S.C. 154(b) by 447 days.

(21) Appl. No.: 15/146,066

(22) Filed: May 4, 2016

(65) Prior Publication Data
US 2017/0322920 A1 Nov. 9, 2017

(51) Int. Cl.
*G06F 40/174* (2020.01)
*G06Q 30/06* (2012.01)
*G06Q 50/12* (2012.01)
*G06F 16/2457* (2019.01)
*G06F 40/205* (2020.01)
*G06F 40/279* (2020.01)
*G06F 40/289* (2020.01)

(52) U.S. Cl.
CPC ...... *G06F 40/174* (2020.01); *G06F 16/24578* (2019.01); *G06F 40/205* (2020.01); *G06F 40/279* (2020.01); *G06F 40/289* (2020.01); *G06Q 30/0633* (2013.01); *G06Q 30/0641* (2013.01); *G06Q 50/12* (2013.01)

(58) Field of Classification Search
CPC .... G06F 17/243; G06F 40/174; G06F 40/279; G06F 40/205; G06F 40/289; G06F 16/24578; G06Q 30/0633; G06Q 30/0641; G06Q 50/12

USPC ......................................................... 715/226
See application file for complete search history.

(56) References Cited

U.S. PATENT DOCUMENTS

| 6,813,603 B1 * | 11/2004 | Groner | G10L 15/26 704/235 |
| 6,874,023 B1 * | 3/2005 | Pennell | G06Q 10/107 709/203 |

(Continued)

OTHER PUBLICATIONS

International Search Report and Written Opinion for PCT Application No. PCT/US2016/069181, dated May 11, 2017. 15 pages.

*Primary Examiner* — Andrew R Dyer
(74) *Attorney, Agent, or Firm* — Botos Churchill IP Law (57) ABSTRACT

The technology relates to dispatching entered data to appropriate input fields. One or more computing devices may scan a first location to detect a set of input fields and determine an associated data type for each input field in the set of input fields. A text box may be generated and displayed, the text box including instructions requesting entry of user data based on the associated data types of each input field. The computing devices may receive the entered user information in the text box, parse the entered information into one or more parts, compare each of the one or more parts to the associated data type for each input field, and associate each of the one or more parts with the input field corresponding to the associated data type which it satisfies. Each of the one or more parts may be dispatched to the input field corresponding to the associated data type which the respective one or more part satisfies. Each input field may be automatically populated with the one or more parts which were dispatched to the respective input field.

12 Claims, 9 Drawing Sheets

(56) References Cited

U.S. PATENT DOCUMENTS

| | | | | |
|---|---|---|---|---|
| 7,203,660 | B1* | 4/2007 | Majeed | G06Q 30/0633 705/14.1 |
| 7,216,292 | B1* | 5/2007 | Snapper | G06F 17/243 715/234 |
| 7,500,201 | B2* | 3/2009 | Treibach-Heck | G06F 3/0482 715/224 |
| 7,877,679 | B2* | 1/2011 | Ozana | G06F 16/95 715/221 |
| 8,214,362 | B1* | 7/2012 | Djabarov | G06F 17/243 707/713 |
| 8,661,540 | B2* | 2/2014 | Hamid | G06F 21/31 726/23 |
| 8,751,535 | B1* | 6/2014 | Kim | G06F 21/6245 707/784 |
| 8,806,322 | B2* | 8/2014 | Iversen | G06F 17/243 715/225 |
| 8,904,274 | B2* | 12/2014 | Gnanasambandam | H04M 1/72522 715/226 |
| 9,098,481 | B2* | 8/2015 | Gwozdz | G06F 17/243 |
| 9,177,174 | B1* | 11/2015 | Shoemaker | H04L 63/08 |
| 9,374,501 | B2* | 6/2016 | Wshah | G06K 9/00 |
| 9,465,786 | B2* | 10/2016 | Lurey | G06F 21/123 |
| 9,508,057 | B2* | 11/2016 | Joa | G06Q 10/10 |
| 9,639,508 | B2* | 5/2017 | Tidhar | G06F 17/2247 |
| 9,721,040 | B2* | 8/2017 | Schwartz | G06Q 30/00 |
| 9,947,003 | B2* | 4/2018 | Clark | G06Q 20/3221 |
| 10,042,837 | B2* | 8/2018 | Carrier | G06F 17/241 |
| 10,142,835 | B2* | 11/2018 | Cotterill | G06F 21/35 |
| 10,255,609 | B2* | 4/2019 | Kinkead | G06Q 30/02 |
| 10,372,733 | B2* | 8/2019 | Eigner | G06F 21/60 |
| 10,474,838 | B1* | 11/2019 | Edwards | G06F 21/6245 |
| 2002/0013788 | A1* | 1/2002 | Pennell | G06F 17/243 715/224 |
| 2002/0023024 | A1* | 2/2002 | Kaimowitz | G06Q 30/06 705/26.35 |
| 2003/0159071 | A1* | 8/2003 | Martinez | G06F 21/31 726/8 |
| 2005/0135571 | A1* | 6/2005 | Bangalore | G06Q 10/06311 379/88.01 |
| 2005/0198563 | A1* | 9/2005 | Kristjansson | G06F 17/243 715/224 |
| 2005/0257148 | A1* | 11/2005 | Goodman | G06F 17/243 715/226 |
| 2006/0059434 | A1* | 3/2006 | Boss | G06F 17/243 715/780 |
| 2006/0168509 | A1* | 7/2006 | Boss | G06F 17/243 715/226 |
| 2007/0133876 | A1* | 6/2007 | Chande | G06F 17/243 382/181 |
| 2008/0184102 | A1* | 7/2008 | Selig | G06F 17/243 715/234 |
| 2008/0215976 | A1* | 9/2008 | Bierner | G06F 17/243 715/708 |
| 2008/0267505 | A1* | 10/2008 | Dabet | G06F 17/243 382/181 |
| 2009/0222475 | A1* | 9/2009 | Scoda | G06F 16/9577 |
| 2010/0070843 | A1* | 3/2010 | Duym | G06F 17/243 715/224 |
| 2010/0192076 | A1* | 7/2010 | Eischeid | G06F 17/211 715/764 |
| 2011/0264665 | A1* | 10/2011 | Mital | G06F 16/9535 707/741 |
| 2012/0144285 | A1* | 6/2012 | Bach | G06F 17/243 715/221 |
| 2013/0198598 | A1* | 8/2013 | Kirsch | G06F 16/957 715/226 |
| 2014/0173407 | A1* | 6/2014 | Kruglick | G06F 17/276 715/226 |
| 2014/0201102 | A1* | 7/2014 | Srinivasan | G06Q 10/00 705/342 |
| 2014/0258828 | A1* | 9/2014 | Lymer | G06F 17/243 715/224 |
| 2015/0193391 | A1* | 7/2015 | Khvostichenko | G06Q 10/00 715/205 |
| 2015/0223006 | A1* | 8/2015 | Hornung | H04W 4/60 455/418 |
| 2015/0371155 | A1* | 12/2015 | Saint-Just | G06Q 10/02 705/5 |
| 2016/0085743 | A1* | 3/2016 | Haley | G06F 40/284 704/9 |
| 2016/0300573 | A1* | 10/2016 | Carbune | G10L 15/193 |
| 2017/0316411 | A1* | 11/2017 | Kimes | G06Q 20/12 |
| 2018/0260085 | A1* | 9/2018 | Whitelaw | G06F 17/243 |

* cited by examiner

FIGURE 4 http://www.a.com/orderform

World's Best Pizza

330 — Delivery Address:

- 310 — Name: John Doe
- 312 — Address Line 1: 1600 Amphitheatre Parkway
- 314 — Address Line 2: #2
- 316 — City: Mountain View
- 318 — State: CA
- 320 — Zip: 64043

340 — Payment Information:

- 322 — CC #: 1234567890123456
- 324 — Exp: 12/30
- 326 — CCV: 112

SUBMIT

Figure 7 http://www.a.com/orderform

World's Best Pizza

Delivery Address:

Name: John Doe

Address Line 1: 1600 Amphitheatre Parkway  v  ~ 815
1600 Amphitheatre Parkway
2 Mountain View Rd.  ~ 810
1230 Mountain View Rd.
1230 Amphitheatre Parkway Zip: 64043

Payment Information:

CC #: 1234567890123456

Exp: 12/30  v  ~ 825
1230  ~ 820
1600

SUBMIT

DISPATCH OF USER INPUT TO MULTIPLE INPUT FIELDS IN A USER INTERFACE

BACKGROUND

The entry of data into computing devices, such as mobile devices, can be cumbersome. Data requests from the computing device are usually solicited through forms with multiple input fields. In the context of mobile devices with limited input devices, such as small touchscreens, the process of moving between each input field and entering the requested data is difficult. Select the intended input field may require multiple attempts, and typographical errors caused by the small input device may be numerous.

SUMMARY

Embodiments within the disclosure relate generally to manufacturing structured forms. One aspect includes a method for dispatching entered data. One or more computing devices may scan a first location to detect a set of input fields and determine an associated data type for each input field in the set of input fields. The one or more computing devices may then generate and display a text box including instructions requesting entry of user data based on the associated data types of each input field. The entered user information in the text box may then be received by the one or more computing devices and the entered information may be parsed into one or more parts. The one or more computing devices may then compare each of the one or more parts to the associated data type for each input field and associate each of the one or more parts with the input field corresponding to the associated data type which it satisfies. Each of the one or more parts may then be dispatched by the one or more computing devices to the input field corresponding to the associated data type which the respective one or more part satisfies and each input field may be automatically populated with the one or more parts which were dispatched to the respective input field.

In some embodiments, the one or more computing devices may determine a first part of the entered information fails to satisfy at least one of the associated data types for each input field and generate and display a second text box requesting the user enter new information to correct or remove the first part of the entered information.

In some embodiments, the text box may be overlaid on top of the first location.

In some embodiments, the associated data types may comprise at least one of alpha-numeric data, alphabetic data, numerical data, data of a certain length, and data of a specific format.

In some embodiments, a first part and a second part of the one or more parts may be dispatched to the same input field.

In some embodiments, the first part and the second part may be ranked, and the same input field may be populated with the higher ranked part listed first and the lower ranked part listed second.

In some embodiments, one or more completion services may be queried for possible completion values for each of the one or more parts, wherein associating each of the one or more parts with the input field corresponding to the associated data type further comprises associating the completion values for each of the one or more parts to the input field corresponding to the associated data type which the respective one or more part satisfies.

Another aspect includes a system for dispatching entered data. The system may comprise one or more computing devices having one or more processors and memory storing instructions. The instructions, may be executable by the one or more processors and may comprise scanning a first location to detect a set of input fields, determining an associated data type for each input field in the set of input fields, generating and displaying a text box including instructions requesting entry of user data based on the associated data types of each input field, receiving the entered user information in the text box; parsing the entered information into one or more parts, comparing each of the one or more parts to the associated data type for each input field, associating each of the one or more parts with the input field corresponding to the associated data type which it satisfies, dispatching each of the one or more parts to the input field corresponding to the associated data type which the respective one or more part satisfies, and automatically populating each input field with the one or more parts which were dispatched to the respective input field.

Another aspect includes non-transitory computer-readable medium storing instructions. The instructions, which when executed by one or more processors, may cause the one or more processors to scan a first location to detect a set of input fields, determine an associated data type for each input field in the set of input fields, generate and display a text box including instructions requesting entry of user data based on the associated data types of each input field, receive the entered user information in the text box, parse the entered information into one or more parts, compare each of the one or more parts to the associated data type for each input field, associate each of the one or more parts with the input field corresponding to the associated data type which it satisfies, dispatch each of the one or more parts to the input field corresponding to the associated data type which the respective one or more part satisfies, and automatically populate each input field with the one or more parts which were dispatched to the respective input field.

BRIEF DESCRIPTION OF THE DRAWINGS

The present technology is illustrated by way of example, and not by way of limitation, in the figures of the accompanying drawings in which like reference numerals refer to similar elements including.

DETAILED DESCRIPTION

Overview

The technology relates to automatically parsing and dispatching entered information to appropriate input fields. For instance, a user may cause a computing device to navigate to a location within an application or on the internet, such as a website, which includes one or more input fields. The input fields may allow for the user to enter information. For example, the location may be a website order form and the input fields may instruct a user to enter delivery address information and payment information to complete an order on the website order form.

Each input field may only accept certain data types. In this regard, each input field may only allow for data of a certain type or types to be input into its respective field. Such data types may include alphabetic data, numerical data, alphanumeric data, data of a certain length, data of a specific format, etc.

Upon loading the location, a dispatching program operating on the computing device may detect the presence of the input fields at the location, and upon detection of the presence of the input fields, automatically overlay an input box on the display of the computing device. In some embodiments the input box may be overlaid on top of the location or presented in a different display area. In some embodiments two or more input boxes may be overlaid on the display of the computing device. The two or more input boxes may be displayed at the same time or consecutively.

The input box may correspond with one or more of the input fields. For example, the input box may correspond to the input fields associated with the delivery address and the payment information. In another embodiment, two or more input boxes may correspond to different input fields. For example, a first input box may correspond to the input fields associated with the delivery address and the second input box may correspond to the input fields associated with the payment information.

The input box may request the user to enter the information which satisfies its respective corresponding input fields. In this regard, the input box may provide instructions to a user about which information should be entered. Such instructions may be a summary of the instructions of the corresponding input fields. For example, the input box may provide summarized instructions to a user to enter their delivery address and payment information, to satisfy the input fields.

The instructions provided by the input box may be determined from information embedded within the location, by the dispatching program. In this regard, the dispatching program may determine if the location provides instructions for the input box to display. In some embodiments the dispatching program may analyze the input fields associated with the input box to determine what information the input fields are requesting. Based on the type of information being requested, the dispatching program may generate instructions summarizing the information being requested.

Upon receiving information entered into the input box, the entered information may be parsed and subsequently dispatched to the appropriate input field. In this regard, the information entered may be separated into discrete parts or groups of discrete parts and the dispatching program may associate each discrete part and/or groups of discrete parts (parts) with one or more input fields. For each part the dispatching program may compare the part to the data types associated with the input fields. Upon determining the part satisfies a data type of an input field, the part may be dispatched to the satisfied input field. Each dispatched part may be used to populate the respective input field to which it was dispatched.

In some embodiments more than one part may be dispatched to an input field. For example, an input field may only accept alphabetic data types and the entered information may include two or more alphabetic parts. As such, the two or more alphabetic parts may be dispatched to the input field.

External or internal sources of supplemental data may be used to assist in dispatching the parts to their respective input fields. In this regard, the dispatching program may rely on sub-databases of data, such as historical data, mapping data, address books, contacts data, name directories, etc. These sub-databases may be stored remotely or internally to the device running the dispatching program.

Completion services may also be used to assist in dispatching the parts to their respective input fields. Completion services may analyze the entered information and return possible completion values for each input field. In this regard, each completion service may provide possible completion values for specific types of input fields.

Each association of a part to an input field may limit the association of the other parts to input fields. In this regard, the dispatching program may determine one or more parts which each satisfy a respective input field and, based on these one or more parts, the association of the remaining parts may be limited.

The completion services implementations can be global or local, and public or private. In this regard, the completion services can be implemented on the computing device or at an external location. Additionally, the data provided by the completion services can be private data, such as a user's credit card information, or public, such as a street address of a business.

The dispatching program may compare the entered information to previously entered information to increase the likelihood of correctly populating the input fields. In some embodiments an input field may be populated by multiple parts allowing the user to select the correct part.

The dispatching program may supplement the information entered into the input box. In this regard, the information entered into the input box may be missing information requested by one or more input fields. The dispatching program may determine the missing information requested by the one or more input fields based on the parts of the entered information which are associated with other input fields.

In the event one or more parts fail to satisfy any input field data types, the one or more parts may be ignored, or presented to the user for correction. Further, if certain information requested by the input fields is not entered, additional text boxes may be presented requesting the information and/or the input field associated with the missing information may be left empty.

The features described herein may allow a user to enter information in a single location, without having to navigate through individual input fields. Such navigation can be exceedingly difficult in handheld devices, such as smartphones. By allowing the user to enter information in a single location, the user may be able to more quickly enter the information requested by the input fields. In addition the features described above may allow for the computing device to enter information not known by the user Example Systems FIGS. 1 and 2 include an example system 100 in which the features described above may be implemented. It should not be considered as limiting the scope of the disclosure or usefulness of the features described herein. In this example, system 100 can include computing devices 110, 120, and 130 as well as storage system 150. Each computing device can contain one or more processors 112, memory 114 and other components typically present in general purpose computing devices. Memory 114 of each of computing devices 110, 120, and 130 can store information accessible by the one or more processors 112, including instructions 116 that can be executed by the one or more processors 112.

Memory can also include data 118 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 116 can be any set of instructions to be executed directly, such as machine code, or indirectly, such as scripts, by the one or more processors. In that regard, the terms "instructions," "application," "steps," and "programs" can be used interchangeably herein. The instructions can be stored in object code format for direct processing by a processor, or in any other computing device language including scripts or collections of independent source code modules that are interpreted on demand or compiled in advance. Functions, methods, and routines of the instructions are explained in more detail below.

Data 118 may be retrieved, stored, and modified by the one or more processors 112 in accordance with the instructions 116. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can be any conventional processors, such as a commercially available CPU. Alternatively, the processors can be dedicated components such as an application specific integrated circuit ("ASIC") or other hardware-based processor. Although not necessary, one or more of computing devices 110, 120, and 130 may include specialized hardware components to perform specific computing processes, such as decoding video, matching video frames with images, distorting videos, encoding distorted videos, etc. faster or more efficiently.

Figure 1:
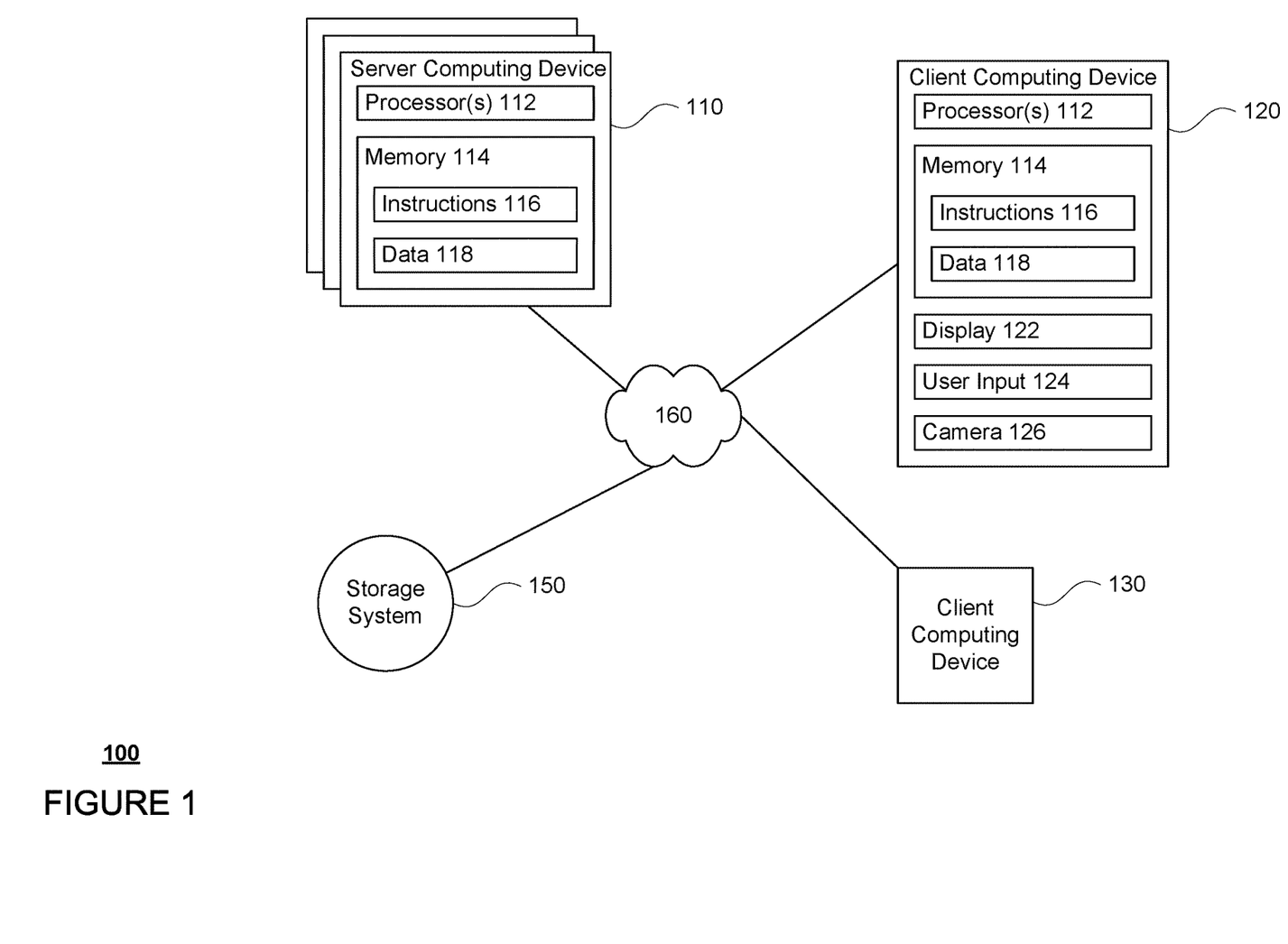
FIG. 1 is a functional diagram of an example system in accordance with aspects of the disclosure.

Although FIG. 1 functionally illustrates the processor, memory, and other elements of the computing devices as being within the same block, the processor, computer, computing device, or memory can actually comprise multiple processors, computers, computing devices, or memories that may or may not be stored within the same physical housing. For example, the memory 144 can be a hard drive or other storage media located in housings different from that of the computing device 110.

References to a processor, computer, computing device, or memory will be understood to include references to a collection of processors, computers, computing devices, or memories that may or may not operate in parallel. For example, the computing device 110 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over network 160.

Figure 2:
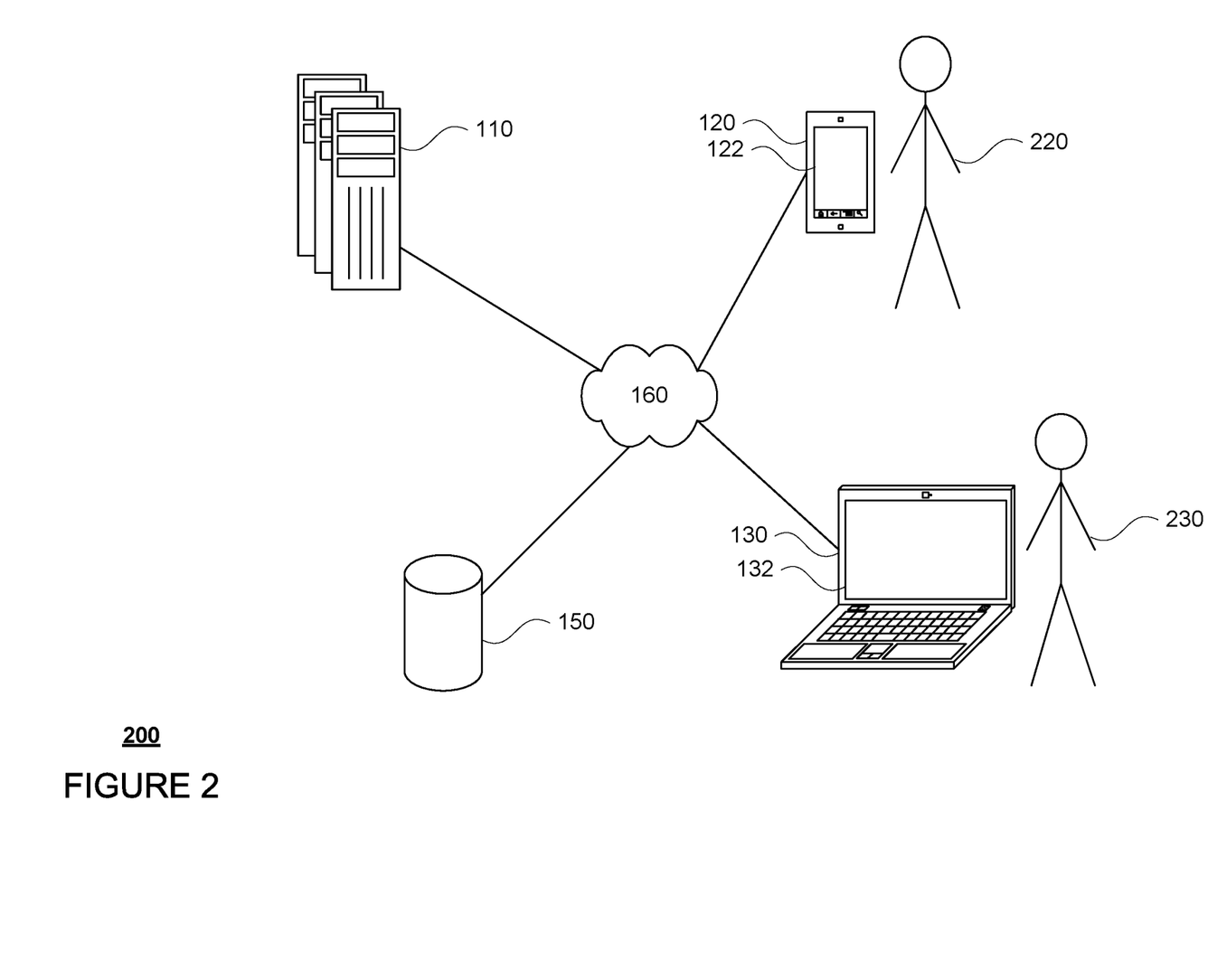
FIG. 2 is a pictorial diagram of the example system of FIG. 1.

Each of the computing devices can be at different nodes of a network 160 and capable of directly and indirectly communicating with other nodes of network 160. Although only a few computing devices 110, 120, and 130 are depicted in FIGS. 1-2, it should be appreciated that a typical system can include a large number of connected computing devices, with each different computing device being at a different node of the network 160. The network 160 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, each of the computing devices 110 may include web servers capable of communicating with storage system 150 as well as computing devices 120 and 130 via the network. For example, one or more of server computing devices 110 may use network 160 to transmit and present information to a user, such as user 220 or 230, on a display, such as displays 122 or 132 of computing devices 120 or 130. In this regard, computing devices 120 and 130 may be considered client computing devices, and may perform all or some of the features described herein.

Each of the client computing devices 120 and 130 may be configured similarly to the server computing devices 110, with one or more processors, memory and instructions as described above. Each client computing device 120 or 130 may be a personal computing device intended for use by a user 220 or 230, and have all of the components normally used in connection with a personal computing device such as a central processing unit (CPU), memory (e.g., RAM and internal hard drives) storing data and instructions, a display such as displays 122 or 132 (e.g., a monitor having a screen, a touch-screen, a projector, a television, or other device that is operable to display information), and user input device 124 (e.g., a mouse, keyboard, touch-screen, or microphone). The client computing device may also include a camera for recording video streams and/or capturing images, speakers, a network interface device, and all of the components used for connecting these elements to one another.

Although the client computing devices 120 and 130 may each comprise a full-sized personal computing device, they may alternatively comprise mobile computing devices capable of wirelessly exchanging data with a server, such as server computing device 110, over a network such as the Internet. By way of example only, client computing device 120 may be a mobile phone or a device such as a wireless-enabled PDA, a tablet PC, or a netbook that is capable of obtaining information via the Internet. In another example, client computing device 130 may be a tablet or laptop computer. As an example the user may input information using a small keyboard, a keypad, microphone, using visual signals with a camera, or a touch screen.

As with memory 114, storage system 150 can be of any type of computerized storage capable of storing information accessible by the server computing devices 110, such as a hard-drive, memory card, ROM, RAM, DVD, CD-ROM, write-capable, and read-only memories. In addition, storage system 150 may include a distributed storage system where data is stored on a plurality of different storage devices which may be physically located at the same or different geographic locations. Storage system 150 may be connected to the computing devices via the network 160 as shown in FIG. 1 and/or may be directly connected to any of the computing devices 110, 120, and 130 (not shown).

Memory 114 and storage system 150 may include one or more databases. In one example, the memory 114 may include a database comprised of a plurality of sub-databases which store public and private data including a web browsing history database, a search history database, a maps history database, an address book database, an e-mail archive database, and a calendar entries database. For example, the address book database may include personal data corresponding to a user's contacts, such as contact's names, phone numbers, addresses, etc. In some embodiments the sub-databases may be comprised of a number of different sub-databases containing private and/or public data. Other information, such as credit card information, may be stored in other sub-databases. The database may also be stored in the storage system 150 or at the servers 110.

The information stored in each of these sub-databases may be associated with specific programs or types of applications, or with overall operation of the computing devices 120 and 130. For instance, the web browsing history and search history databases may be associated with one or more web browsers such as Edge, Safari, Firefox or Chrome web browsers. The maps history database may also be associated with the web browsers or other applications such as Google Earth. The address book and e-mail archive databases may be linked to messaging applications, such as Gmail or Microsoft Outlook. The calendar entries database may similarly be linked to the messaging application or other application such as Google Calendar. While a number of different sub-databases have been identified above, other sub-databases which may contain location-related information may also be employed, such as the database associated with Google Latitude, a tool which lets users share their current location with friends.

Example Methods

Figure 3:
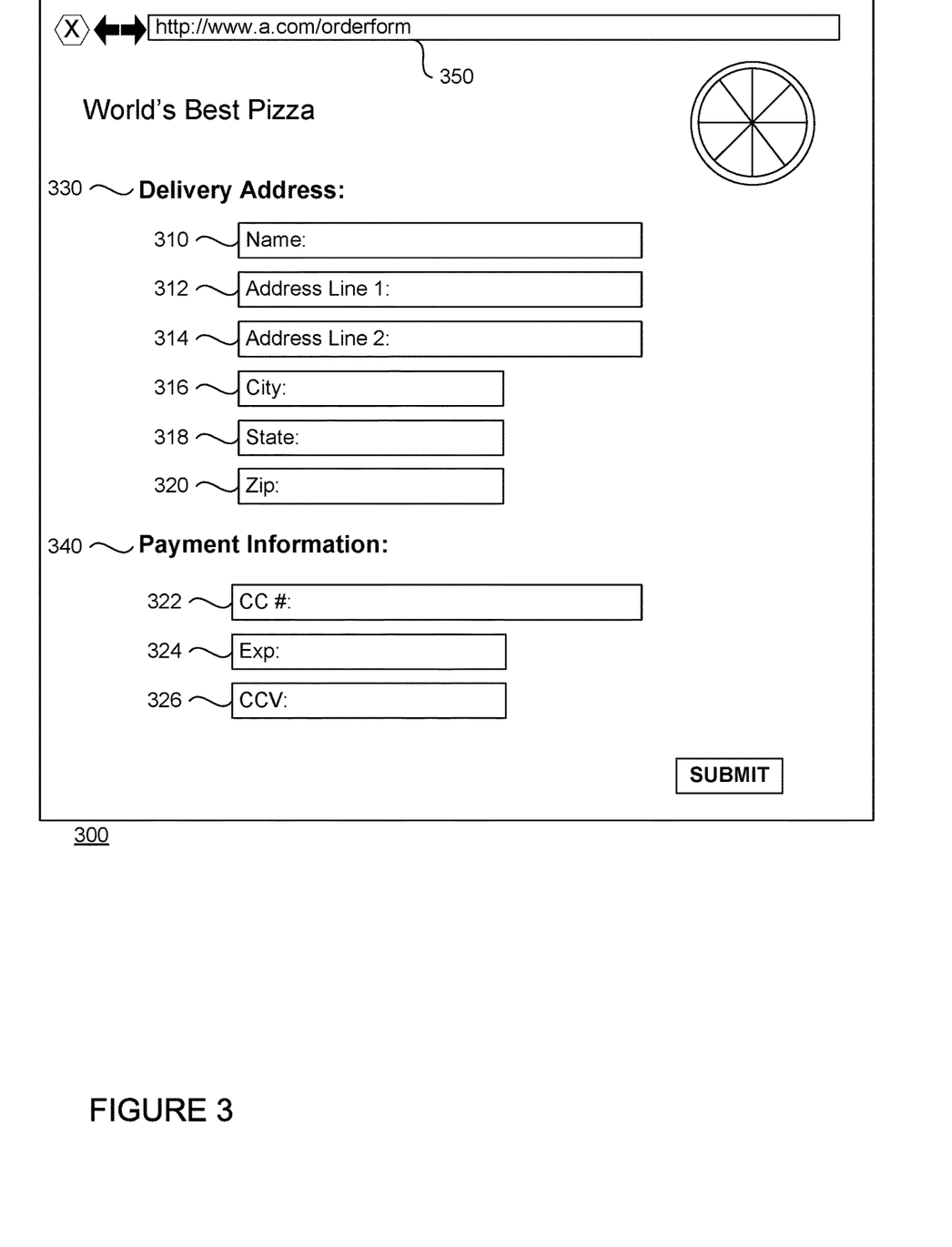
FIG. 3 is an example website associated with input fields in accordance with aspects of the disclosure.

In order to automatically parse and dispatch entered information to appropriate input fields, a user may cause a computing device, such as computing device 120 or 130, to navigate to a location, such as a website, which includes one or more input fields. The input fields may allow for the user to enter information. As an example, the location may be a website 300 for a pizza restaurant located at web-address 350, as shown in FIG. 3. The website 300 may include an order form including sections, such as a delivery address section 330 and a payment section 340. Additionally, the website may include a number of input fields 310-326. The input fields 310-326 may instruct a user, such as user 220, to enter delivery address information and payment information to complete an order on the website order form. In one example, input field 320 may instruct the user to enter a zip-code associated with the delivery address.

Each input field may only accept certain data types. In this regard, each input field may only allow for data of a certain type or types to be input into its respective field. Such data types may include alphabetic data, numerical data, alpha-numeric data, data of a certain length, data of a specific format, etc. For example, referring to the FIG. 3, the "Address Line 1" input field 312 and "Address Line 2" input field 314 may only accept alpha-numeric data. In another example, the "CC #" (credit card number) input field 322 and "CCV" (card verification value) input field 326 may only accept numeric data of sixteen digits and three digits, respectively. In some embodiments one or more of the input fields may allow for two or more data types to be entered.

Figure 4:
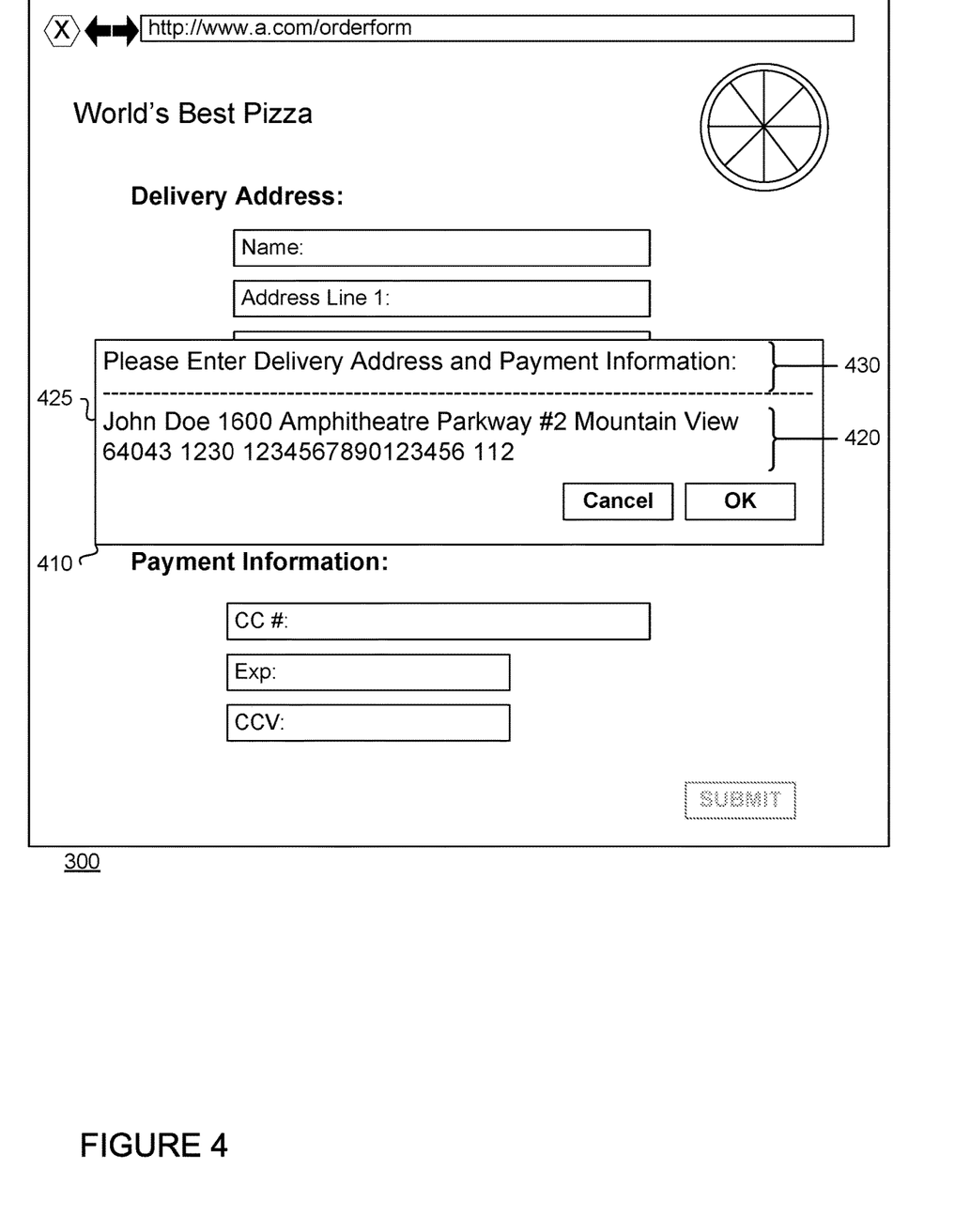
FIG. 4 is an example screen shot with an input box overlaid on a website in accordance with aspects of the disclosure.

Upon loading the location, a program on the computing device may detect the presence of the input fields and automatically overlay an input box on the display of the computing device. For example, as shown in FIG. 4, when the user navigates to the website 300, an input box 410 may be automatically overlaid onto the display of the computing device, such as computing device 120. In some embodiments the user may be presented with a pop-up notification or banner notification, notifying them that one or more input boxes are available. Upon the user selecting the notification, the one or more input boxes may be displayed.

The input box may be presented at different areas of the display. In this regard, programming instructions stored in the dispatching program, or programming instructions stored at the location, may provide the area(s) where the input box may be displayed. For example, as further shown in FIG. 4, programming instructions stored at the website 300, or on the user device, may cause the input box 410 to be overlaid on at the center of the website 300. In some embodiments the programming instructions may instruct the user's computing device to display the input box in a different display area, such as in a notification banner or separate program window. Additionally, two or more input boxes may be presented on the display of the computing device. The two or more input boxes may be displayed at the same time or consecutively.

The input box may correspond with one or more of the input fields and/or sections. For example, as shown in FIG. 4, the input box 410 may correspond to the delivery address section 330, payment information 340 section, as well as the input fields found therein (i.e., 310-326). In another embodiment, two or more input boxes may correspond to different input fields or sections. For example, a first input box may correspond to the input fields associated with the delivery address section 330 (i.e., input fields 310-320.) A second input box may correspond to the input fields associated with the payment information section 340 (i.e., input fields 322-326.)

The input box may request the user to enter information which satisfies its respective corresponding input fields. In this regard, the input box may provide instructions to a user about which information should be entered. Such instructions may be a summary of the instructions of the corresponding input fields. For example, as further shown in FIG. 4, the input box 410 may provide summarized instructions 430 to a user to enter their delivery address and payment information, to satisfy the input fields corresponding to the delivery address section 330 and the payment information section 340 (i.e., input fields 310-326.)

The instructions provided by the input box may be determined from data embedded within the location by the dispatching program. In this regard, each input field may be explicitly associated with one or more labels as defined by the location. The one or more labels may indicate the type of data which is requested at those respective input fields. Additionally, each section of the location may include a section label which summarizes the information being requested by the associated input fields. For example, the dispatching program may analyze data received from the website 300 and determine the labels associated with each of input fields 310-326. The one or more labels associated with input fields may indicate the type of data which is requested at those respective input fields. Moreover, the dispatching program may analyze the data of the website 300 to determine section labels, "delivery address" and "payment information" associated with sections 330 and 340, respectively. In some embodiments the labels and the section labels may include accessibility labels used in accessibility programming.

Based on one or more of the labels or of the section labels, the dispatching program may generate instructions summarizing the information being requested. For example, the dispatching program may analyze the section labels associated with the delivery address section 330 and payment information section 340 to determine that their respective section labels request a "delivery address" and "payment information." The dispatching program may then generate instructions 430 requesting delivery and payment information, as further shown in FIG. 4. In another example, the dispatching program may analyze the one or more labels associated with the input fields, such as the labels associated with input fields 310-326. The dispatching program may then generate instructions based on the labels associated with the input fields. In additional embodiments the location may provide the text of the instructions to be displayed in each input box, thereby removing the need for the dispatching program to determine the instructions to be provided by the input box.

Information may then be entered into the input box by the user in accordance with the instructions of the input box. As further shown in FIG. 4, the user may enter information 420 into the text input area 425 of the input box 410, in accordance with the instructions 430. The entered information 420 may be input in any order by the user, and may not include all of the data necessary to satisfy the requirements all of the input fields 310-326, associated with the input box 410.

Upon receiving the entered information, the entered information may be parsed and subsequently dispatched to the appropriate input fields. In this regard, the entered information entered may be separated into discrete parts or groups of discrete parts. For example, the dispatching program may analyze the entered information 420 and break it into discrete parts such as "John," "Doe," "View," and "Mountain," as well as groups of discrete parts such as "John Doe," "Mountain View," etc.

The dispatching program may associate each discrete part and/or groups of discrete parts (parts) with one or more input fields. In this regard, for each part the dispatching program may compare the part to the data types associated with the input fields. Upon determining the part satisfies a data type of an input field, the part may be dispatched to the satisfied input field. For example, the dispatching program may compare two parts of the entered information, such as "1234567890123456" and "64043" against the data types of the input fields 310-326. The dispatching program may determine the "CC #" and "CCV" input fields, 322 and 326, may only accept numeric data of sixteen digits and three digits, respectively. The dispatching program may then determine the "CC #" input field 322 and "CCV" input field 326 are satisfied by parts "1234567890123456" and "64043," respectively. The parts "1234567890123456" and "64043" may then be dispatched to the "CC #" input field 322 and "CCV" input field 326, respectively.

Figure 5:
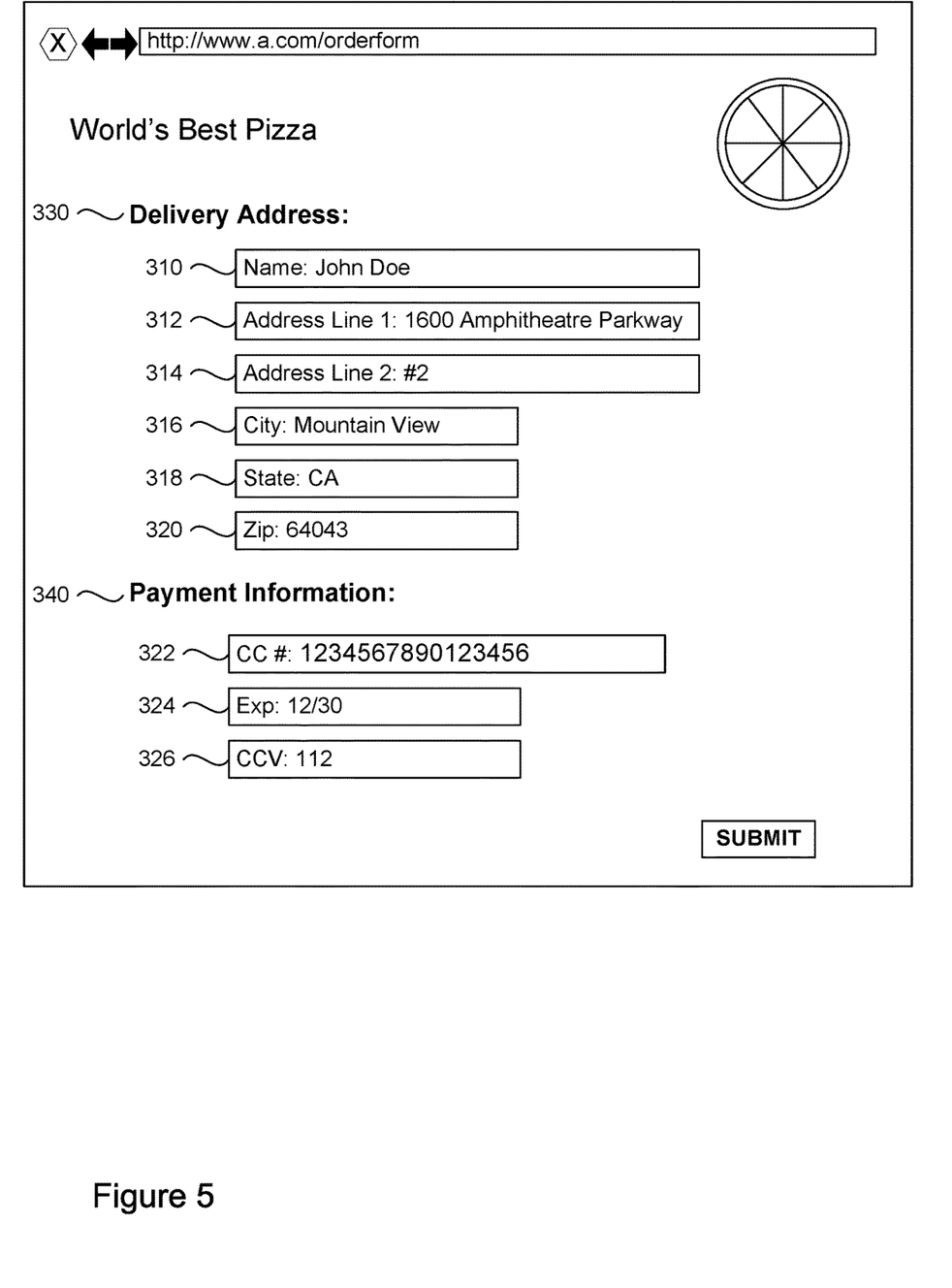
FIG. 5 is an example website with filled input fields in accordance with aspects of the disclosure.

Each dispatched part may be used to populate the respective input field to which it was dispatched. For example, as shown in FIG. 5, the dispatching program may populate the "CC #" input field 322 and "CCV" input field 326 with dispatched parts "1234567890123456" and "64043," respectively.

In some embodiments more than one part may be dispatched to an input field. For example, referring to FIGS. 3 and 4, the "Name" input field 310 may only accept alphabetic data types. Additionally, the entered information 420 may include two or more alphabetic parts, such as "John" and "Doe." As such, the two or more alphabetic parts of the entered information 420 may be dispatched to the "Name" input field 310.

External or internal sources of supplemental data may be used to assist in dispatching the parts to their respective input fields. In this regard, the dispatching program may rely on sub-databases of data, such as historical data, mapping data, address books, contacts data, name directories, etc. As noted above, sub-databases may be stored remotely or internally to the device running the dispatching program. For example, the dispatching program may determine that parts "John" and "Doe," when taken in combination is found in an address book sub-database associated with the user. As such, the dispatching program may dispatch "John Doe" to the "Name" input field 310, as shown in FIG. 5.

The opposite may also occur. For example, the dispatching program may determine that "Amphitheatre Parkway" is not a name in the address book sub-database, and therefore the dispatching program may determine that "Amphitheatre Parkway" does not satisfy the "Name" input field.

Figure 6:
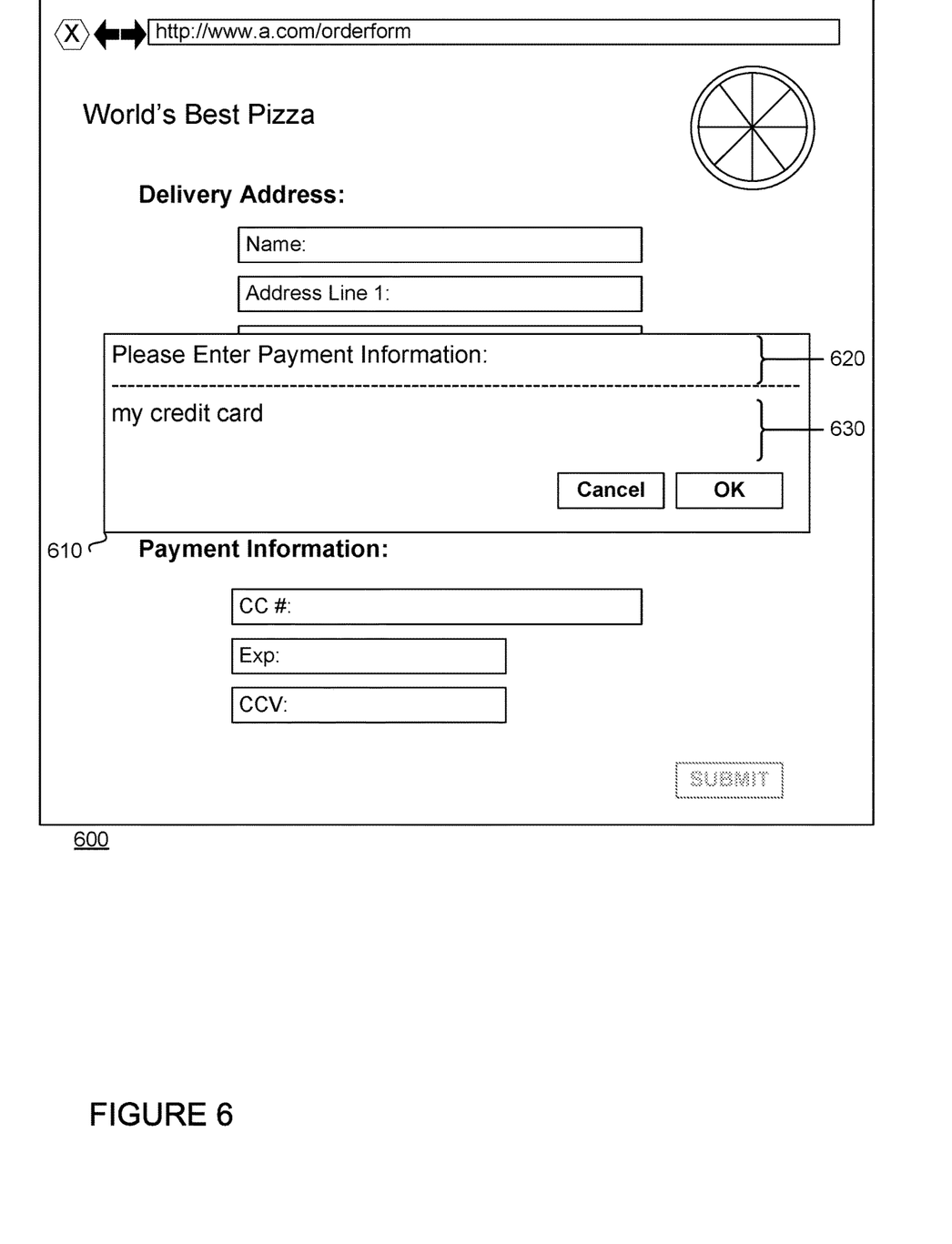
FIG. 6 is an example screen shot with an input box overlaid on a website in accordance with aspects of the disclosure.

Completion services may also be used to assist in dispatching the parts to their respective input fields. Completion services may analyze the entered information and return possible completion values for each input field. In this regard, each completion service may provide possible completion values for specific types of input fields. For example, as shown in FIG. 6, when the user navigates to website 600, an input box 610 may be presented. The input box 610 may provide instructions to enter payment information. The user may enter information 630, which includes "my credit card," into the input box 610. The dispatching program may then determine that the entered information 630 corresponds to payment information, and subsequently send the entered information to a credit card completion service. In some embodiments the dispatching program may send all entered information to one or more completion services, regardless of the type of data which is entered.

Figure 7:
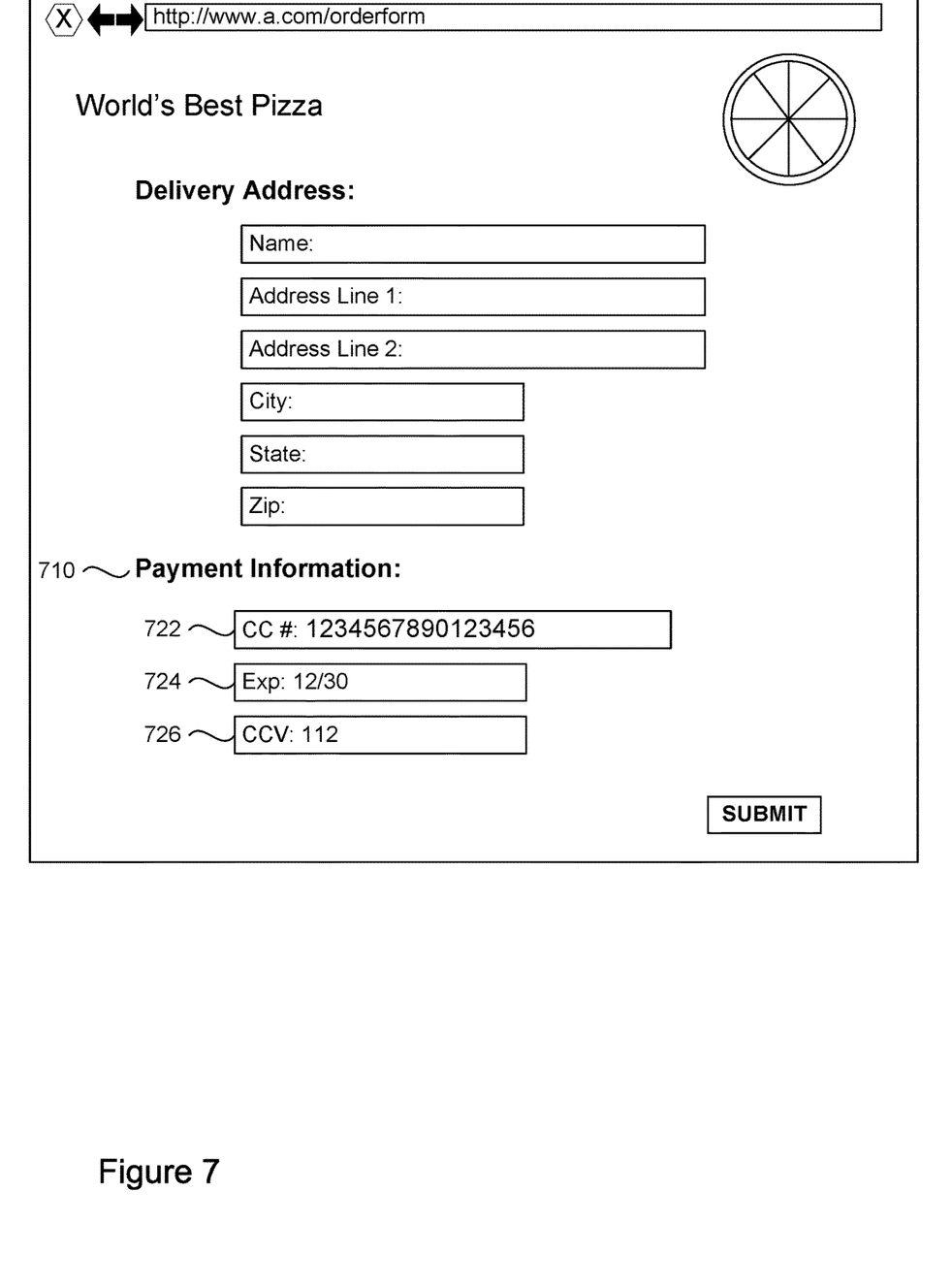
FIG. 7 is an example website with a portion of the input fields filled in accordance with aspects of the disclosure.

The completion service may receive the information provided by the dispatching program, and determine whether possible completion values are available based on the received data. Continuing the previous example, the credit card completion service may determine that the entered information 630 "my credit card," corresponds to the user's bank credit card, and may then retrieve the user's bank credit card information for use as possible completion values. The credit cart completion service may then forward the user's bank credit card information to the dispatching program. As shown in FIG. 7, the dispatching program may then populate the fields 722-726, associated with the payment information section 710, with the received bank credit card information.

The completion services can be global or local, and access private public or private data. In this regard, the completion services can be implemented on the computing device or at an external location, such as server 110. Additionally, the data provided by the completion services can be private data, such as a user's credit card information, or public data, such as a street address of a business. User permission may be required for the dispatching program or completion service to access the private data. In one example, a user's private home address may be stored locally in a private address book sub-database. Referring back to FIG. 4, when the dispatching program parses "1600" into a part, the dispatching program may query a local completion service, such as an auto-completion service on the computing device. With permission from the user, the auto-completion service may accesses the private address book sub-database. The local address completion service may determine that part "1600" matches part of an address in the address book sub-database. The matching address may be forwarded to the dispatching program as a possible completion values, and populated into the input fields associated with the address (e.g., input fields 310-320.) If the user fails to provide permission to access private data, the dispatching program would not access the local completion services, such as the auto-completion service.

In another example, when the dispatching program parses "1600" into a part, the dispatching program may query a global mapping completion service, such as Google Maps which serves public data. The mapping completion service may access public address data, and determine possible completion values by determining which public addresses adequately match the "1600" part. The global mapping completion may then forward the matching addresses to the dispatching program for populating the input fields. In some embodiments, if a large number of results are determined by one of the completion services, only the most relevant results, as described herein, may be forwarded to the dispatching program.

As additional information is entered into a text input box, the possible completion values may be updated by the completion services. For example, referring back to FIG. 4, when the user enters the numeral '1,' the dispatching program may dispatch the '1' as a discrete part to an address completion service and a payment completion service. Each completion service may provide possible completion values based on the '1' to the dispatching program. As the user continues to enter the numeral '6,' the dispatching program may dispatch the '16,' as a discrete part to both completion services. The address completion service may determine that '16' corresponds to 1600 Amphitheater Parkway, and will update the possible completion value previously sent to the dispatching program. The payment completion service may determine that no possible payment completion values include '16,' and will return no possible completion values to the dispatching program.

Each association of a part to an input field may limit the association of the other parts to input fields. In this regard, the dispatching program may determine one or more parts which each satisfy a respective input field and, based on these one or more parts, the association of the remaining parts may be limited. For example, referring again to FIG. 5, the dispatching program may determine that part "64043" satisfies the "Zip:" input field 320. As such, the dispatching program may use mapping data, as found in the mapping sub-database or a completion service, to determine that there is no street, city, or state named "John Doe" in the 64043 zip code. Thus, "John Doe" may not be associated with the "Address Line 1" 312 "City" 316 or "State" 318 input fields. In another example, the dispatching program may determine that "Mount View" and "Amphitheater Parkway" are streets in the 64043 zip code, and dispatch both to the "Address Line 1" input field 312.

The dispatching program may compare the entered information to previously entered information to increase the likelihood of correctly populating the input fields. For example, if a user has previously filled out a text box on a website order form, the previously entered information and its association to the populated input fields may be stored by the dispatching program. When the dispatching program determines the entered information matches the previously entered information, the input fields may be populated by the entered information based on the previously entered information and its association to the populated input fields.

Figure 8:
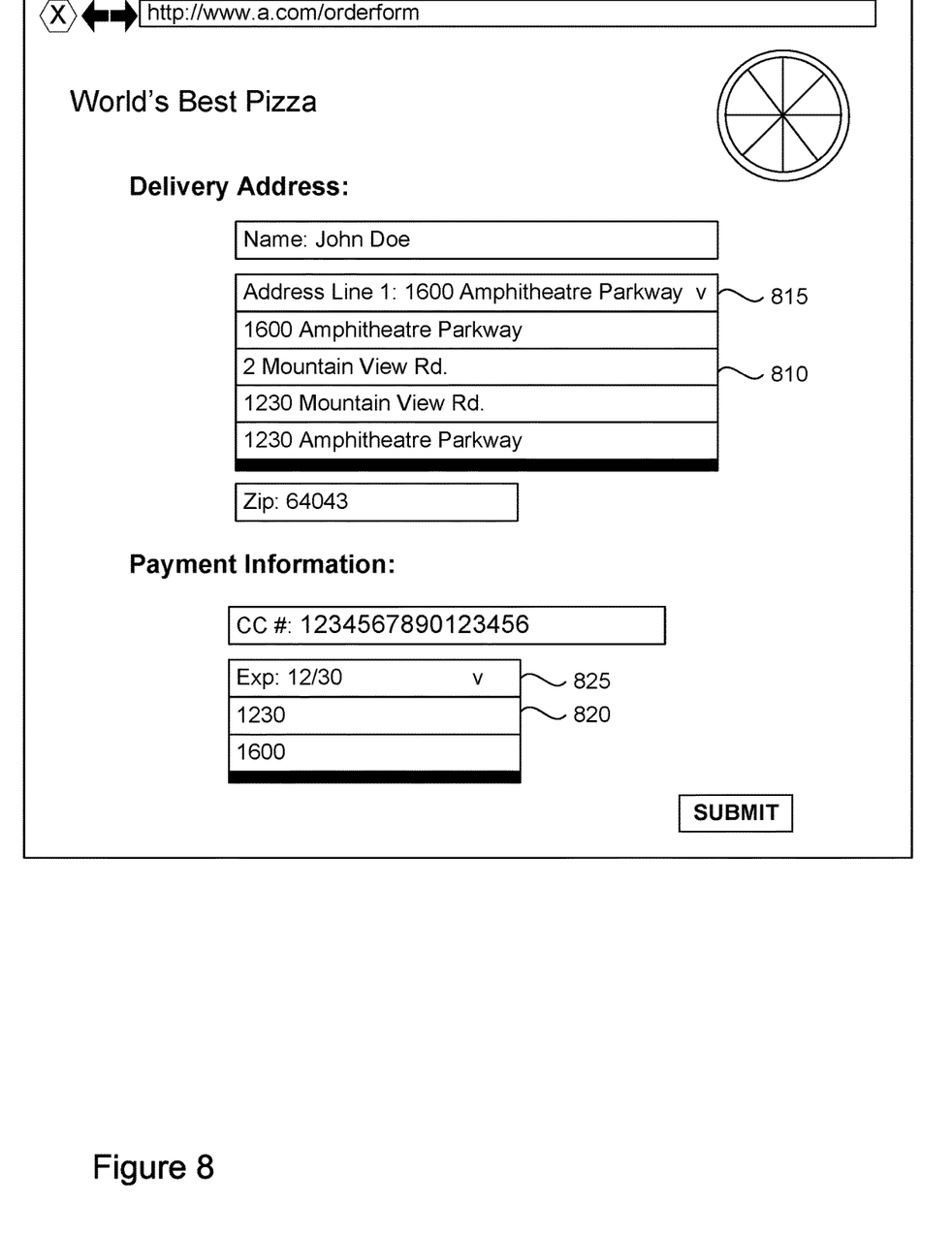
FIG. 8 is an example screen shot of an example website with drop down lists corresponding to filled input fields in accordance with aspects of the disclosure.

An input field may be populated by multiple parts allowing the user to select the correct part. In this regard, when two or more parts are dispatched to the same input field the dispatching program may rank the two or more parts according to relevancy based on predetermined criteria. Such predetermined criteria may include determining which part was most recently used in the input field or which part matches the previously entered information. For example, as shown in FIG. 8, the highest ranked parts 815 and 825 may be presented as the top selection in drop down lists, 810 and 820, respectively. The user may then select between the two parts, with the highest ranking part displayed first in the input field. In some embodiments other display elements may be used to enable the user to select between the two parts, such as dialog boxes or radio buttons.

In some embodiments relevancy of a part may be based on public or private data of the completion services or the dispatching program. In this regard, based on the settings of the dispatching program, the relevancy of all of available data determined by analyzing the global or local frequency or importance of a word or phrase in the parts. For example, a part may contain the name of a large city and small village. The completion service may determine that the large city is a priori more likely to appear in a location input field than the name of a small village. As such, the completion service may forward instructions to the dispatching program to display the large city first. In another example, a completion service may determine that the large city is less likely to appear in the location input field based on the other user's queries at a certain location, and therefore forward instructions to the dispatching program to display the small village first.

The dispatching program may supplement the information entered into the input box. In this regard, the information entered into the input box may be missing information requested by one or more input fields. The dispatching program may determine the missing information requested by the one or more input fields based on the parts of the entered information which are associated with other input fields. For example, the dispatching program may determine that none of the parts satisfy the "State" input field. However, the dispatching program may determine from mapping data that zip code "64043" is located in California, and automatically populate the "State" input field 318 with "CA," as shown in FIG. 5.

In some embodiments, the entered information may be parsed and dispatched incrementally and in substantially real-time. For instance, as the user enters "12," the entered information may be parsed after the entry of each character, such as after the '1' is entered and after the '2' is entered. Each time the entered information is parsed, the parts may be dispatched and populated in one or more input fields, such as to the "Exp" input field 324 and the "CC #" input field 322. As such, the "Exp" and CC #" fields may display '1' after the user enters the '1' and '12' after the user enters the '2'. The user may select one of the displayed entries as correct, and the other unselected entry may be removed.

In the event one or more parts fail to satisfy any input field data types, the one or more parts may be ignored, or presented to the user for correction. Further, if certain information requested by the input fields is not entered, additional text boxes may be presented requesting the information and/or the input field associated with the missing information may be left empty.

Figure 9:
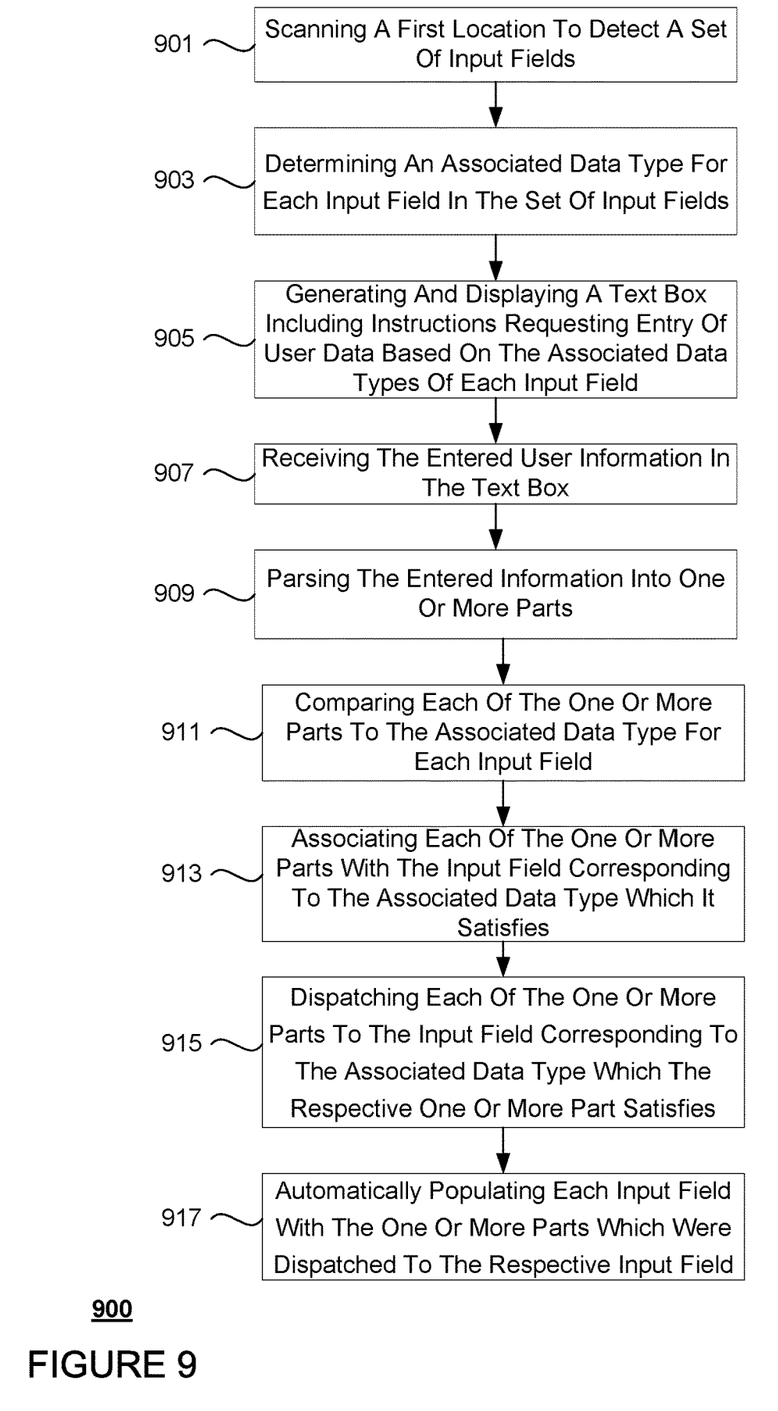
FIG. 9 is a flow diagram in accordance with an embodiment.

Flow diagram 900 of FIG. 9 is an example flow diagram of some of the aspects described above that may be performed by one or more computing devices such as client computing devices 120 or 130. It will be understood that the steps discussed herein are merely an example; the steps may occur in a different order, steps may be added, and steps may be omitted. In this example, at block 901, a first location, such as a webpage, may be scanned by the one or more computing devices to detect a set of input fields. At block 903 an associated data type for each input field in the set of input fields may be determined, and the computing device may generate and display a text box including instructions requesting entry of user data based on the associated types of each input field, as shown at block 905. The computing device may then receive the entered user information in the text box and parse the entered information into one or more parts, as shown in blocks 907 and 909. As shown at blocks 911 and 913, the computing device may compare each of the one or more parts to the associate data type for each input field and associate each of the one or more parts with the input field corresponding to the associated data type which it satisfies. The computing device may then dispatch each of the one or more parts to the input field corresponding to the associated data type which the respective one or more part satisfies, as shown in block 915. Each input field may then be automatically populated with the one or more parts which were dispatched to the respective input field, as shown in block 917.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A computer implemented method for dispatching entered data, the method comprising:
   scanning, with the one or more computing devices, a first location to detect a set of input fields, wherein the set of input fields is configured to receive at least two inputs;
   determining, by the one or more computing devices, one or more associated data types for each input field in the set of input fields;
   generating and displaying, by the one or more computing devices, a first text box distinct from the set of input fields including instructions requesting entry of user data for responding to multiple input fields of the set of input fields based on the one or more associated data types determined for each input field;
   receiving, by the one or more computing devices, user entered information in the first text box;
   parsing, by the one or more computing devices, the user entered information into a plurality of parts;
   querying, by the one or more computing devices, one or more completion services for possible completion values for at least one of the plurality of parts of the parsed user entered information;
   comparing, by the one or more computing devices, each of the plurality of parts to the one or more associated data types determined for each input field;
   determining, based on one or more results of the comparing, whether each one of the plurality of parts satisfies the one or more associated data types determined for each input field;
   determining, by the one or more computing devices, that a first part of the parsed user entered information fails to satisfy at least one of the one or more associated data types determined for each input field;
   generating and displaying, by the one or more computing devices, a second text box requesting the user to enter new information to correct or remove the first part of the parsed user entered information;
   dispatching, by the one or more computing devices, each of the plurality of parts to the input field that was determined to satisfy the one or more associated data types; and
   populating, by the one or more computing devices, each input field with at least one of the plurality of parts which were dispatched to the input field that was determined to satisfy the one or more associated data types, or at least one completion value found in response to the querying.

2. The method of claim 1, wherein the first text box is overlaid on top of the first location.

3. The method of claim 1, wherein a first part and a second part of the plurality of parts are dispatched to the same input field.

4. The method of claim 3, further comprising:
   ranking the first part and second part; and
   populating the same input field with the higher ranked part listed first and the lower ranked part listed second.

5. A system for dispatching entered data, the system comprising:
   one or more computing devices having one or more processors; and
   memory storing instructions, the instructions executable by the one or more processors;
   wherein the instructions comprise:
      scanning a first location to detect a set of input fields, wherein the set of input fields is configured to receive user input of information;
      determining one or more associated data types for each input field in the set of input fields;
      generating and displaying a first text box distinct from the set of input fields including instructions requesting entry of user data for responding to multiple input fields of the set of input fields based on the one or more associated data types determined for each input field;
      receiving user entered information in the first text box;
      parsing the user entered information into a plurality of parts;
      querying one or more completion services for possible completion values for at least one of the plurality of parts of the parsed user entered information;

comparing each of the plurality of parts to the one or more associated data types for each input field;

determining, based on one or more results of the comparing, whether each one of the plurality of parts satisfies the one or more associated data types for each input field;

determining that a first part of the parsed user entered information fails to satisfy at least one of the one or more associated data types;

generating and displaying a second text box requesting the user to enter new information to correct or remove the first part of the parsed user entered information;

dispatching each of the plurality of parts to the input field that was determined to satisfy the one or more associated data types; and populating each input field with at least one of the plurality of parts which were dispatched to the input field that was determined to satisfy the one or more associated data types, or at least one completion value found in response to the querying.

6. The system of claim 5, wherein the first text box is overlaid on top of the first location.

7. The system of claim 5, wherein a first part and a second part of the plurality of parts are dispatched to the same input field.

8. The system of claim 7, wherein the instructions further include:

ranking the first part and second part; and populating the same input field with the higher ranked part listed first and the lower ranked part listed second.

9. A non-transitory computer-readable medium storing instructions, which when executed by one or more processors, cause the one or more processors to:

scan a first location to detect a set of input fields, wherein the set of input fields is configured to receive user input of information;

determine one or more associated data types for each input field in the set of input fields;

generate and display a first text box distinct from the set of input fields including instructions requesting entry of user data for responding to multiple input fields of the set of input fields based on the one or more associated data types determined for each input field;

receive user entered information in the first text box;

parse the user entered information into a plurality of parts;

query one or more completion services for possible completion values for at least one of the plurality of parts of the parsed user entered information;

perform a comparison of each of the plurality of parts to the one or more associated data types determined for each input field;

determine, based on one or more results of the comparison, whether each one of the plurality of parts satisfies the one or more associated data types determined for each input field;

determine that a first part of the parsed user entered information fails to satisfy at least one of the one or more associated data types;

generate and display a second text box requesting the user to enter new information to correct or remove the first part of the parsed user entered information;

dispatch each of the plurality of parts to the input field that was determined to satisfy the one or more associated data types; and populate each input field with at least one of the plurality of parts which were dispatched to the input field that was determined to satisfy the one or more associated data types, or at least one completion value found in response to the querying.

10. The non-transitory computer-readable medium of claim 9, wherein the first text box is overlaid on top of the first location.

11. The non-transitory computer-readable medium of claim 9, wherein a first part and a second part of the plurality of parts are dispatched to the same input field.

12. The non-transitory computer-readable medium of claim 11, wherein the instructions further cause the one or more processors to:

rank the first part and second part; and populate the same input field with the higher ranked part listed first and the lower ranked part listed second.

* * * * *